No. 715,546. Patented Dec. 9, 1902.
C. S. BRADLEY.
GENERATING ALTERNATING CURRENTS.
(Application filed Apr. 23, 1902.)
(No Model.)
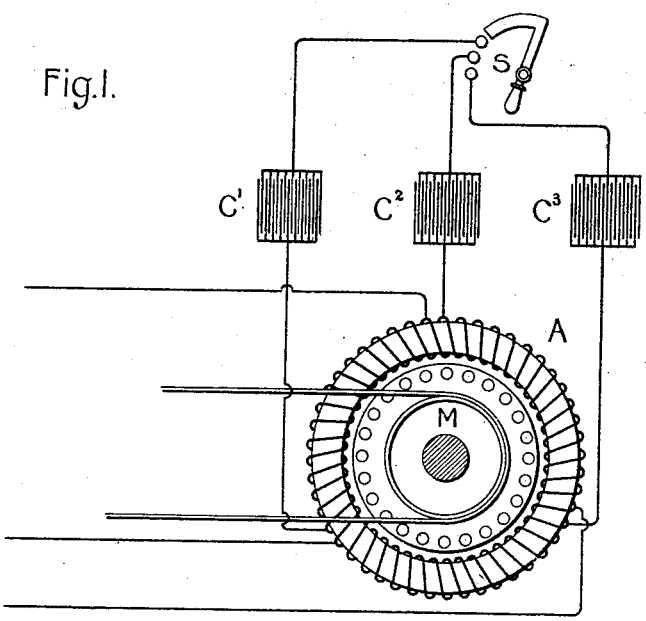
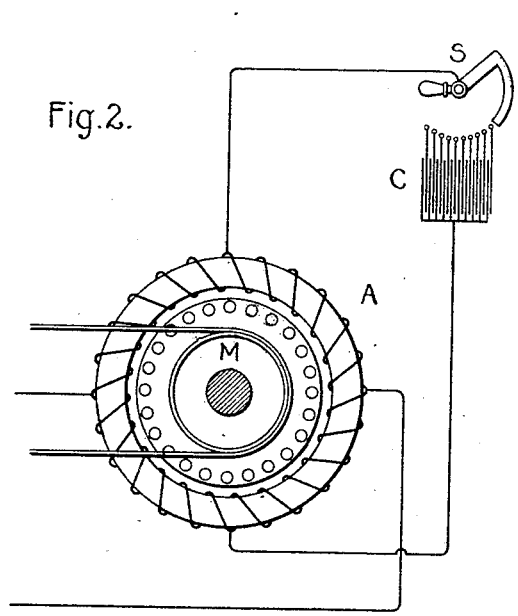
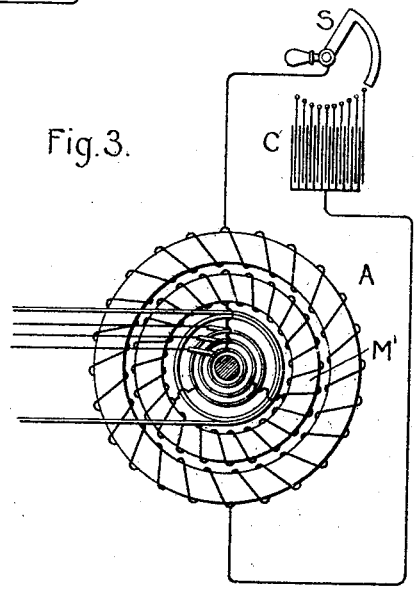
Witnesses.
J. Ellis Glenn
Helen Orford
Inventor.
Charles S. Bradley
by
Atty.

UNITED STATES PATENT OFFICE.

CHARLES S. BRADLEY, OF AVON, NEW YORK.

GENERATING ALTERNATING CURRENTS.

SPECIFICATION forming part of Letters Patent No. 715,546, dated December 9, 1902.

Original application filed June 22, 1896, Serial No. 596,424. Divided and this application filed April 23, 1902. Serial No. 104,286. (No model.)

*To all whom it may concern:*

Be it known that I, CHARLES S. BRADLEY, a citizen of the United States, residing at Avon, county of Livingston, State of New York, have invented certain new and useful Improvements in Generating Alternating Currents, (Case No. 2,860,) of which the following is a specification.

This invention relates to alternating-current generators.

The object of the invention is to develop alternating currents of simple or polyphase character and of any desired rate of alternation by apparatus of more simple construction than that heretofore employed.

I carry out the invention by providing one element of the generator with a winding connected in circuit with an electric condenser or several condensers and a switch for opening and closing the condenser-circuit and provide a coöperating element adapted to be driven by a prime mover. Either element may be provided with a generating circuit or winding for carrying current off to a work-circuit. The rate of alternation may be varied by operating the prime mover at a constant speed and rendering the condenser or condensers adjustable to vary the resonant rate of electric vibration in the field-magnet circuit, in which case the generating-winding will be wound upon the field-magnet, or the condensers may be adjusted for a definite constant rate of electric vibration and the prime mover be varied in speed, the generating-circuit being in such case wound upon the element which coöperates with the field-magnet. The terms "field-magnet" and "armature" are to be understood as the magnetizing and generating members, respectively, when such terms are employed in this specification. In one form of the invention both the field-magnet and the armature-circuits are wound upon the same core, the coöperating element being in such case a closed circuited winding in inductive relation to the field-magnet and movable relatively thereto. When polyphase currents are to be generated, the connections with the magnetizing-circuit on the field-magnet will be such as to develop a rotary magnetic field, and the relatively movable element should be operated at a speed above synchronism with the rate for which the condenser-circuit is resonantly adjusted. The condenser-circuits are provided with a switch by which they may be opened or closed. When the generator is shut down, the condenser-circuits are left open, and the remanent static charge they retain serves to furnish an initial charge to the field-magnet when the generator is again operated. Thus the necessity of an independent exciter is avoided. If the period of inactivity of the generator should be so long as to permit too great dissipation of the condenser charge, it may be given an initial charge by any small source of alternating or vibratory currents.

In Figure 1 of the accompanying drawings is shown one form of the invention, the condenser being of constant value. In Fig. 2 the condenser is shown as variable. In Fig. 3 the currents are taken from the coöperating element of the generator instead of from the one in which the magnetizing-currents are used.

A represents a field-magnet provided with a polyphase winding in circuit with three condensers $c'$ $c^2$ $c^3$. In the circuit is a switch S, by which the field-magnetizing circuit may be closed or opened.

M is a coöperating element of the generator, provided with a closed winding (shown in Figs. 1 and 2 as a simple squirrel-cage winding) well understood by those familiar with the construction of alternating-current apparatus. This element is shown provided with a driving pulley and belt for connection with a prime mover, and when operated at a speed above synchronism with the rate of electric vibration of the field-magnetizing circuit will generate currents in the circuit B, having the same time period or rate as the condenser-circuit and the electromotive force of which will depend upon the difference in speed of the rotary field developed by the condenser-circuits and the driven element of the generator. It will of course be understood that it is the relative motion of the elements A and M which determines the question of generation of current, and that therefore M might be the fixed, and A the movable, element. When the switch S is closed, the remanent charge of the condensers furnishes an initial charge to the field-magnet A, and the element M being in motion this charge is immediately magnified by inductive reaction and a rotary field is set up in A. The rate of travel of the field, and consequently the rate of alternation of the generated current, depends upon the relation of capacity and inductance in the condenser-circuits and may be made anything desired by properly proportioning the two factors. When a variable rate is required, the capacity of the condenser or condensers may be made variable. Such an organization is shown in Fig. 2, where also a single-phase organization is shown, and the work-circuit is supplied directly from the magnetizing-winding. In this case the generator is started up by the prime mover and the switch closed, thus furnishing an initial magnetizing-current, and the condenser is then adjusted to a resonant rate of vibration corresponding to the desired rate of alternation. The work-circuit may be derived from any symmetrically-distributed points of the winding, but are preferably taken off at points midway between the points of connection with the charging-circuit. Alternating currents may also be derived from the driven element, in which case it should be provided with a ring or drum winding and tapped at suitable points. Such an organization is shown in Fig. 3 at M'.

A generator of the kind described herein is eminently adapted for high-speed prime movers, such as rotary engines and turbines, for the reason that the periodicity of the generated current is a differential of two speeds, one controlled by the prime mover and the other controlled by the resonant rate established by a condenser in a circuit in which it is included. Evidently, therefore, the speed of the prime mover must be the sum of the speeds of the rotary field established by the condenser and the driven element. When the machine is in action, the energy in the condenser-circuits is furnished independently from the driven element; but the period is determined by the condensers and will vary according to the relation of their capacity and the inductance of the machine.

This application is a division of my pending application, Serial No. 596,424, filed June 22, 1896.

What I claim as new, and desire to secure by Letters Patent of the United States, is—

1. The method of operating an induction-generator whose field-magnet is charged by a condenser, which consists in opening the condenser-circuit while the machine is in motion to preserve the condenser charge, and starting the machine by bringing it into motion and then closing the switch.

2. The method of operating an alternating-current generator having in its field-magnet circuit a condenser, consisting in charging the condenser by the action of the machine when the latter is in operation, then opening the field-magnet circuit to create a remanent charge in the condenser, and producing an initial field-magnet charge when the machine is restarted by closing the field-magnet circuit and permitting the condenser to discharge.

3. The method of operating an induction-generator, which consists in storing energy by the operation of the generator, preventing its escape, utilizing the stored charge to energize the field-magnet of the generator when started up, and driving the generating member above synchronism in said field.

In witness whereof I have hereunto set my hand this 19th day of April, 1902.

CHARLES S. BRADLEY.

Witnesses:
C. N. ENNIG,
WALTER H. MILLER.